(12) United States Patent
Mayalil et al.

(10) Patent No.: US 10,869,073 B2
(45) Date of Patent: *Dec. 15, 2020

(54) SIMULTANEOUS PLAYBACK FOR MULTIPLE AUDIENCE MEMBERS WITH DIFFERENT VISUAL AND AUDIO NEEDS

(71) Applicant: Apple Inc., Cupertino, CA (US)

(72) Inventors: Stanley M. Mayalil, San Jose, CA (US); Cole M. Stewart, San Jose, CA (US); Rajesh Ambati, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,455

(22) Filed: Jun. 4, 2019

(65) Prior Publication Data

US 2019/0289348 A1    Sep. 19, 2019

Related U.S. Application Data

(62) Division of application No. 15/492,835, filed on Apr. 20, 2017, now Pat. No. 10,362,346.

(51) Int. Cl.
*H04N 21/242* (2011.01)
*H04N 21/475* (2011.01)
(Continued)

(52) U.S. Cl.
CPC ....... *H04N 21/242* (2013.01); *H04N 21/2387* (2013.01); *H04N 21/23424* (2013.01);
(Continued)

(58) Field of Classification Search
CPC ............ H04N 21/242; H04N 21/4126; H04N 21/41407; H04N 21/4307;
(Continued)

(56) References Cited

U.S. PATENT DOCUMENTS 5,610,653 A * 3/1997 Abecassis ............ G11B 19/022
348/170
6,446,261 B1 * 9/2002 Rosser ................... H04N 7/163
348/E7.061

(Continued)

*Primary Examiner* — Robert J Hance
(74) *Attorney, Agent, or Firm* — Womble Bond Dickinson (US) LLP

(57) ABSTRACT

A method for playing a movie asset in several playback devices. The method receives a request to play a movie asset and synchronizes clocks between a first device and a second device, which is a portable device. The method signals a start of the playback of the asset through the first and second playback devices, where playback on the second device is synchronized with playback on the first device. The method wirelessly transmits an alert message that identifies the asset through the first and second devices and includes a description of an upcoming or future segment of the asset, where a first version of the segment is played back through the first device. In response to receiving the alert message, the second device becomes configured to select a second version of the segment in accordance with i) user settings of the portable device and ii) the description of the segment.

22 Claims, 6 Drawing Sheets

(51) Int. Cl.
*H04N 21/2387* (2011.01)
*H04N 21/472* (2011.01)
*H04N 21/44* (2011.01)
*H04N 21/234* (2011.01)
*H04N 21/41* (2011.01)
*H04N 21/414* (2011.01)
*H04N 21/43* (2011.01)

(52) U.S. Cl.
CPC ..... *H04N 21/4122* (2013.01); *H04N 21/4126* (2013.01); *H04N 21/41407* (2013.01); *H04N 21/4307* (2013.01); *H04N 21/44016* (2013.01); *H04N 21/475* (2013.01); *H04N 21/4755* (2013.01); *H04N 21/4758* (2013.01); *H04N 21/47217* (2013.01)

(58) Field of Classification Search
CPC ....... H04N 21/44016; H04N 21/23424; H04N 21/475; H04N 21/4755; H04N 21/4758; H04L 63/10
See application file for complete search history.

(56) References Cited

U.S. PATENT DOCUMENTS

| | | | | |
|---|---|---|---|---|
| 9,602,871 | B1* | 3/2017 | Holcomb | H04N 21/4394 |
| 2004/0261099 | A1* | 12/2004 | Durden | H04N 21/47211 |
| | | | | 725/32 |
| 2006/0112344 | A1* | 5/2006 | Ducheneaut | H04N 7/17318 |
| | | | | 715/758 |
| 2006/0174312 | A1* | 8/2006 | Ducheneaut | H04N 7/15 |
| | | | | 725/135 |
| 2009/0147709 | A1* | 6/2009 | Muqattash | H04B 17/309 |
| | | | | 370/310 |
| 2009/0288131 | A1* | 11/2009 | Kandekar | G06F 16/4393 |
| | | | | 725/133 |
| 2010/0265397 | A1* | 10/2010 | Dasher | H04N 21/234336 |
| | | | | 348/468 |
| 2014/0150009 | A1* | 5/2014 | Sharma | H04N 21/4532 |
| | | | | 725/28 |
| 2016/0037189 | A1* | 2/2016 | Holden | H04N 21/242 |
| | | | | 725/116 |
| 2016/0196851 | A1* | 7/2016 | Cohen | G11B 27/34 |
| | | | | 386/201 |
| 2017/0244986 | A1* | 8/2017 | Pinckernell | H04N 21/4728 |

* cited by examiner

SIMULTANEOUS PLAYBACK FOR MULTIPLE AUDIENCE MEMBERS WITH DIFFERENT VISUAL AND AUDIO NEEDS

FIELD

An embodiment of the invention relates to a central multimedia device that wirelessly transmits alert messages to one or more portable devices for purposes of simultaneous playback, by the central media device and by the portable device, of different versions of a movie asset which suit different audio visual needs of the audience members. Other embodiments are also described.

BACKGROUND

Many households include several devices that are capable of streaming different types of audio-visual content for playback. These devices include portable devices (e.g., smartphones, tablets, and laptops) and desktop players such as an APPLETV device and a ROKU device. With the proliferation of the Internet and video streaming applications, these devices give their users the capability of watching an almost endless selection of audio-visual content, including television shows, feature films, and video clips, which are stored at a separate remote server.

SUMMARY

An audience of family or friends can be simultaneously entertained, by being in the same room, watching and listening to a television program that is playing on a television set within the room. However, they may each have different audio (or visual) needs. For example, a family, which may consist of adult parents and young children, may want to watch a movie that includes material inappropriate (e.g., offensive language, violence, and nudity) for children under a certain age. While watching the movie, in order for the parents to shield their children from the inappropriate material, the parents may need to ask their children to avert their eyes or cover their ears. This may be ineffective to ensure that the children are not exposed, since the parents may not know exactly where the inappropriate material is in the movie. In another example, rather than shielding family members from inappropriate material, a hearing impaired family member may require additional material to be displayed along with the television program. For instance, captions may need to be activated in order for the family member that is hearing impaired to understand what is going on in the television program. Although beneficial for the hearing impaired family member, captions may be unsightly or distracting for other family members that do not require them. Furthermore, a family having different backgrounds and speaking different languages may be required to settle for playing back the audio in the television program in one language, in which some family members are proficient, while others are not. To solve this problem, most entertainment systems in the marketplace today allow users to turn on subtitles in different languages during playback. Although helpful, this limits the amount of languages to two (one audible and one visual), thereby leaving the audience family member that is proficient in a third language struggling to understand what is being said in the television program.

An embodiment of the invention is a method for automatically ensuring that the playback of a movie asset (e.g., a feature film) which may be streamed by a central multimedia device for simultaneous playback on a given playback device (e.g., a television set having a display screen and built-in loudspeakers) and on a portable playback device of a particular audience member, is adjusted to suit the different needs of the particular audience member that is watching or listening using the portable device. This is accomplished through the use of alert messages (e.g., code words) that are wirelessly transmitted by the central multimedia device during playback of the asset. An alert message may describe an upcoming (future) segment of the asset that is going to be played back. The description may identify the current playback of the asset (e.g., title of the feature film, or a playback session identifier), indicate when the upcoming segment is to be played (e.g., using time markers for the beginning and end of the segment), and identify the type of content in the upcoming segment (also referred to here as content description, e.g., whether the segment includes violence, offensive language, and nudity.) A portable device (e.g., a wireless headset, a tablet computer whose audio output is connected to a wired or wireless headset) that is within a transmission or reception range of the messages and that is willing to adjust its playback of the asset (e.g., has a digital media player software program that has been configured to automatically adjust its playback of a movie asset in order to suit a particular need of its user) may receive the alert message from the central media device. In one embodiment, the portable device examines the message and on that basis determines which version of the asset it needs to play the upcoming segment. The decision may be made based on examining the content description contained within the message, and on the portable devices user settings or user profile (that may be stored in the portable device.) For example, the user settings could indicate that the owner or user of the portable device is 14 years old. If the content description indicates that the upcoming segment includes content inappropriate for a 14 year old, the portable device may in response send a request (e.g., directly to a remote server, or through the central media device) to stream a different or alternate version of the upcoming segment that would be appropriate for a 14 year-old to view or hear. Once the alternate version of the upcoming segment is received, the portable device may replace an original or default version of the upcoming segment with the alternate version. To ensure continued synchronization of the playback across the different devices, the portable device may use time markers contained in the alert message that indicate the start and stop of the upcoming segment, and where the time markers are interpreted by the portable device based on its internal clock having been previously synchronized with an internal clock of the central media device. This process may be repeated as needed during the playback of the asset, to replace additional, selected upcoming segments of the asset. In this way, an audience member may watch an original version of the asset, while another audience member seamlessly sees and/or hears a different version of the asset that is more suitable for the needs of that audience member.

While the central device wirelessly transmits alert messages to enable a portable device to adjust its playback to meet the specific needs of its audience member, the central media device may improve the process through the use of feedback messages it receives from the portable playback device. A feedback message may include information about the quality of a received wireless signal through which the central media device communicates with the portable device. The feedback message may also include timing information that can be used to derive the amount of time it takes for a message sent by the central media device to be received by the portable device. The central device may use the information it receives in the feedback messages to perform network optimization operations in order to improve its communication link, e.g., a through a wireless local area network, with the portable device, including network throughput and signal quality of the wireless signals.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
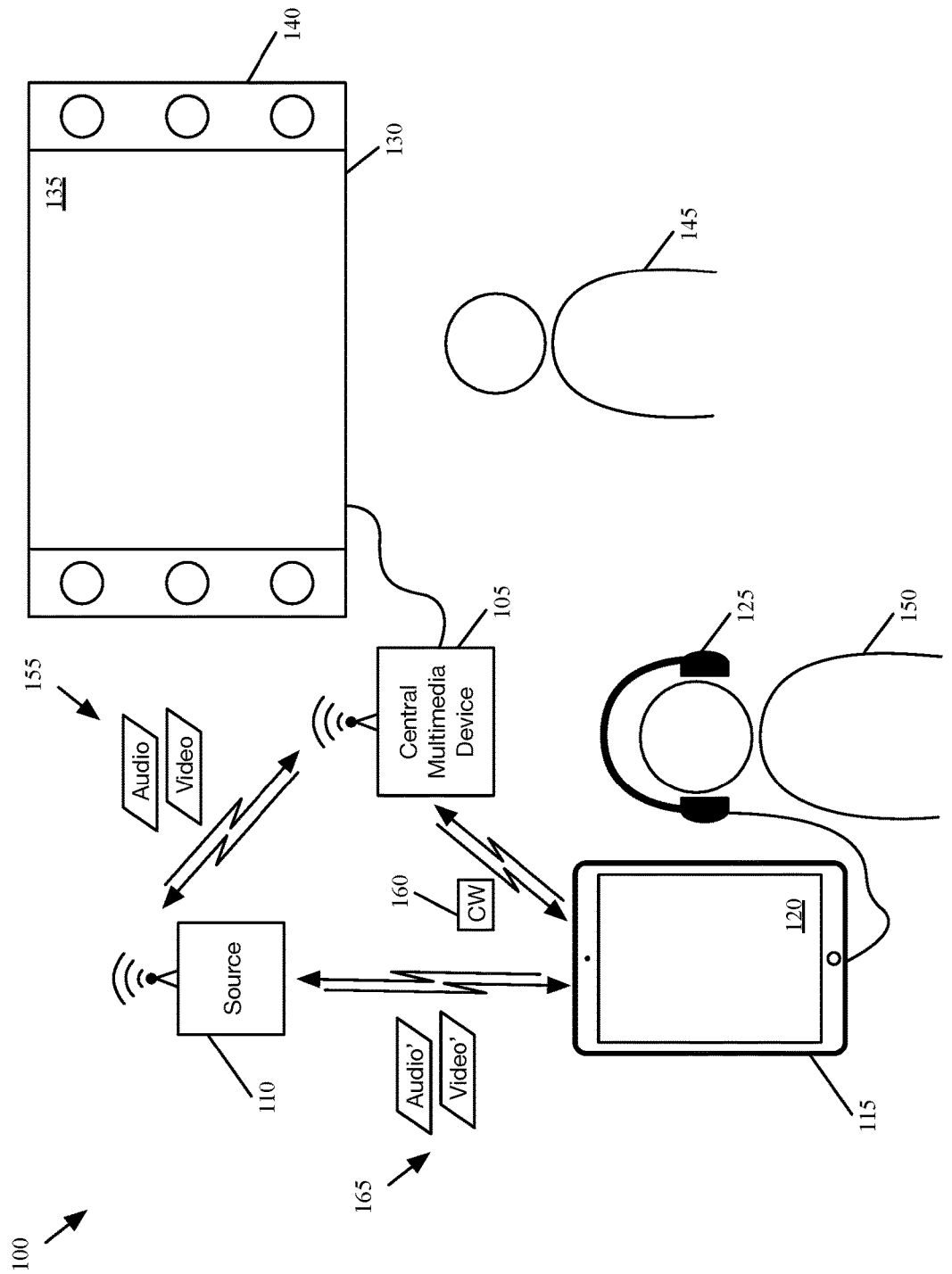
FIG. 1 depicts several people with different audio-visual needs watching and/or listening to different versions of a movie asset.

FIG. 1 depicts a room 100 in which several people (e.g., audience members) 145 and 150 with different audio-visual needs are either watching, listening, or watching and listening to different versions of a movie asset, e.g., any type of audio-visual program content, which may include a television show, a feature film, a video clip, represented as a digital file in any suitable movie file format, e.g., MPEG-4, being streamed by a central multimedia device 105. Specifically, this figure illustrates a room 100 in which person 145 (e.g., a parent) is watching a movie asset that is being played back by a central multimedia device 105 on (or through) a television 130, while another person 150 (e.g., a young child) is simultaneously watching a different version of the movie asset that is being played back at a portable electronic playback device 115.

The room 100 also includes a wireless source 110 and a central multimedia device 105. The central multimedia device 105 includes wireless capabilities, in which it may wirelessly communicate with the wireless source 110 and other wireless portable devices (e.g., 115), using BLUETOOTH protocol, wireless local area network, or any other wireless communication method. For instance, the central multimedia device 105 may wirelessly communicate (e.g., using IEEE 802.11x standards or other wireless standards) with the source 110 and other devices (e.g., 115) by transmitting and receiving data packets (e.g., Internet Protocol (IP) packets). Specifically, the central multimedia device 105 may stream the movie asset from the Internet or a third party provider as would for example an APPLETV device via the wireless source 110. For instance, the central multimedia device may transmit a request to the third party provider for streaming the movie asset. In response to the request, the provider may then transmit a data file containing the movie asset to the central multimedia device 105. In one embodiment, the central multimedia device 105 may stream the movie asset through a video playback application running on the central multimedia device 105. In addition, as later described, while the central multimedia device 105 streams the movie asset (for playback on the television 130), it may also wirelessly transmit alert messages (e.g., codewords or "CWs") that may be used by other portable devices (e.g., 115) to stream (and playback) other versions of the movie asset. A more detailed description of the alert messages, is described in FIG. 3. In one embodiment, the central multimedia device 105 may also wirelessly transmit different (or similar) versions of audio associated with the movie asset to the portable devices for playback simultaneously along with playback of the movie asset by the central multimedia device 105. More about transmitting audio is described in FIG. 2.

To stream the movie asset, the wireless source 110 may transmit data packets 155 containing digital video data and digital audio data of the movie asset to the central multimedia device 105, which are retrieved from a provider. When the central multimedia device 105 receives the data packets 155, signal processing may need to be performed (e.g., by a controller or microprocessor within the central multimedia device 105). In particular, the digital video data contained within the data packets 155 may be encoded using any suitable video codec, e.g., MPEG-4; and the digital audio data contained within the data packets 155 may be encoded using any suitable audio codec, e.g., Advanced Audio Coding (AAC). The video and audio data may be decoded into a digital video signal and a digital audio signal. The central multimedia device 105 may process the movie asset including video and audio, before actual playback (e.g., display or conversion into sound), where such processing may include decompression (of a file that had been compressed for bit rate reduction), image format conversion to suit a particular playback screen image resolution, and audio signal rendering to suit a particular sound output system (e.g., upmixing of audio, downmixing of audio). The audio signal may be a single audio channel or may be more than one audio channel (e.g., an entire audio soundtrack in 5.1-surround format of a motion picture film or movie).

The central multimedia device 105 is connected to a playback device (e.g., television 130), such that while the central multimedia device 105 is streaming the movie asset, it may contemporaneously (or at least partially contemporaneously) be played back through the television 130 for presentation to the user (e.g., 145). For example, once the central multimedia device 105 has processed the data packets into the video and audio signals, it transmits the processed signals to the television 130. The television 130 may present the processed video signal to the user 145 by displaying the video signal on its display screen 135. The television 130 may also output the rendered audio signal to the user 145 by using the rendered audio signal from the central multimedia device 105 to drive output sound transducers within built-in speakers 140 of the television 130. In one embodiment, some of the signal processing performed at the central multimedia device 105 may instead be performed by the television 130, e.g. format conversion. In another embodiment, audio signals rendered by the central multimedia device 105 may be routed to loudspeakers of other consumer electronic devices (e.g., wireless loudspeakers of a home audio entertainment system or a vehicle audio system) for sound output to the user in a particular configuration (e.g., 5.1-surround sound).

The wireless source 110 may be any device that is capable of streaming the movie asset to the central multimedia device 105. For example, the wireless source 110 may be a wireless access point (e.g., wireless router) that provides access to the Internet or a private computer network. The wireless source 110 may also be any other device with wireless means, such as a desktop computer, a laptop, or a mobile device (e.g., a smartphone). To stream the movie asset, the wireless source 110 may retrieve it locally (e.g., from an internal or external hard drive; or from a media playback device, such as a digital versatile disc ("DVD") player or a Blu-Ray player) or remotely (e.g., over the Internet). If the movie asset is retrieved remotely, the wireless source 110 may retrieve it through an internet service provider or over the air (e.g., a cellular network). In one embodiment, the source 110 may be connected to at least one device (e.g., 115 or 105) through a wired connection (e.g., a Universal Serial Bus connection).

Although movie asset played back through the television 130 may be appropriate for the user 145, it may not be appropriate for all people (e.g., 150). Rather than asking person 150 to leave the room 100 or cover their eyes/ears, in one embodiment, it may be prudent to have the person 150 watch or listen to a different, appropriate, version of the movie asset simultaneously with person 145. To do this, portable devices (e.g., 115) may stream a different version of the movie asset than the one being played back by the central multimedia device 105. The portable device 115 (e.g., second playback device) may stream the different version of the movie asset from the wireless source 110, in a similar manner to that of the central multimedia device 105. For instance, the portable device may wirelessly communicate (e.g., using IEEE 802.11x standards or other wireless standards) with the wireless source 110, using BLUETOOTH protocol, a wireless local area network, or any other wireless communication method. The portable device 115 may also stream the movie asset from the Internet or a third party provider, through a video playback application running on the portable device 115. In one embodiment, both the central multimedia device 105 and portable device 115 stream the movie asset through a same video playback application. In one embodiment, rather than stream the movie asset, the portable device 115 may playback a portion of the movie that is stored in physical memory within the portable device 115. In one embodiment, the portion (or the whole of) the movie asset may be previously stored in the physical memory. When streaming the movie asset, the wireless source 110 may transmit data packets 165 (similar to those transmitted to the central multimedia device 105), containing digital video data and digital audio data. The packets 165 transmitted by the wireless source 110 contain either different digital video data, different audio data, or both, with respect to the packets 155, since the portable device 115 is streaming a different version. It may be different in several ways, for example, the different version may include redacted video, audio, or both, or it may include additional video and/or audio content. More about the differences are described in FIG. 6. Once received, the portable device 115 may perform similar signal processing operations as those performed by the central multimedia device, in order to produce a rendered (e.g., first) digital video signal and a rendered (e.g., first) audio signal. The rendered digital video signal may be displayed on (e.g., through) a display screen 120 of the portable device 115 and the rendered audio signal may drive sound output transducers within a pair of headphones 125 that are wired to the portable device 115. In one embodiment, rather than being wired to the portable device 115, headphones 125 may wirelessly communicate with the portable device 115. In another embodiment, the rendered audio signal may drive speakers that are built into the portable device 115.

In order for both the central device 105 and the portable devices 115 to contemporaneously playback different versions of the movie, the central device 105 may utilize a messaging feature. To take advantage of this messaging feature, it may need to be activated by a user (e.g., 145). For example, the user may activate a video playback application running on the central multimedia device 105 (e.g., through a remote control or a software application running on a portable device, such as 115 or a smartphone, which communicates via a communication link with the central multimedia device 105). Once the video playback application is activated, a graphical user interface ("GUI") may be displayed on the display screen 135 of the television 130. The user 145 may navigate through the GUI to activate the messaging feature (e.g., in a menu option). In one embodiment, the user may activate either of the features in a "general" settings menu for the central multimedia device 105.

Once activated, the central multimedia device 105 may wait until the user 145 selects a movie asset (e.g., from a library of movie assets within the video playback application) and presses the "play" button, before sending out alert messages. The alert messages include data that identifies the movie asset that is being played back, or is about to start playback, and describes an upcoming or future segment, e.g., five frames, or a portion of a second, or a few seconds, of the movie asset that is to be played back by the central multimedia device 105. The segment may be of any length, depending on its particular content and duration, e.g., a single word of profanity, a sexually explicit scene. Specifically, each alert message may include data that describes the type of content contained within a particular upcoming segment of the movie asset. For example, if the upcoming segment includes violence, the data may reflect that as broad key terms (e.g., such as "strong brutal violence"), specific key terms (e.g., such as "blood" and "murder") or a Motion Picture Association of America ("MPAA") rating. A portable device may then use this data to decide what version of the segment of the movie asset should be streamed and played back at the portable device 115 to the user 150, instead of the original segment being played back by the central media device, where this decision is made according to user settings (e.g., parental controls) of the portable device 115. For example, if the portable device 115 has user settings indicating the person 150, who is using the portable device 115, is 14 years old, then the portable device 115 may not show content that is rated for someone over the age of 14 (e.g., an MPAA rating of "R"). In that case, the portable device 115 may then display a different version (e.g., a "PG-13" version) of the segment of the movie asset, than the version of the movie asset being played back by the central multimedia device 105 (e.g., a "R" version). Each message also includes data that may be used by a portable device 115 to synchronize playback of an upcoming segment with a corresponding segment that is to be played back by the central multimedia device 115 on the television 130, such as a time marker. More about the messages is described in FIG. 3.

Once the central multimedia device 105 starts streaming the movie asset, the messaging feature may be enabled. For example, the central multimedia device 105 may broadcast or transmit an alert message (e.g., codeword or "CW") 160 over the wireless computer network (e.g., via BLUETOOTH protocol, the wireless local area network, or any other wireless communication method). The central device 105 may transmit the alert message 160 for selected upcoming or future segments for any portable devices (e.g., 115) in the general vicinity to receive and use to simultaneously stream and playback a different version of the movie asset, according to user settings of the portable device. In one embodiment, the central device 105 may transmit alert messages periodically (e.g., every five frames of the movie asset). More about enabling and transmitting messages is described in FIG. 4.

In one embodiment, to utilize the messages 160, the portable device 115 may need to start the same movie asset in a video playback application (e.g., either different or the same as the video playback application running on the central multimedia device 105). In one embodiment, the portable device 115 may receive a request from the user to start the movie asset while the central multimedia device 105 is already streaming and playing back the movie asset on the television 130. In this way, the user 150 may not be required to start the movie asset on the portable device 115 at the same time as the central multimedia device 105. The portable device 115 may stay within a standby mode, until a first message is received from the central multimedia device 105. Once a message 160 is received, the portable device 115 may compare a content description of an upcoming segment of the movie asset in which the message 160 describes, in order to determine which version of the selected upcoming or future segment should be streamed and played back based on a content description contained within the message 160, according to user settings of the portable device 115. Once determined, the portable device 115 communicates with the source 110 to stream the data packets 165 containing digital video and audio data of a version of the segment of the movie asset that is to be played back. In one embodiment, the portable device 115 may playback a same (e.g., original or default) version of the segment of the movie asset to be played back by the central multimedia device 105, while in another embodiment it may be a different version, according to user settings of the portable device 115. The portable device 115 may then process the digital video and audio data into a (e.g., second) video signal and a (e.g., second) audio signal. The portable device 115 may then identify when to playback of the video and audio signals using a time marker, in order for the portable device 115 and the central multimedia device 105 to playback their associated versions of the movie asset simultaneously. Once the time comes (when a shared clock reaches the time marker) to playback the video and audio signals, the portable device 115 may then display the video signal on a display screen 120 and render the audio signals into rendered audio signals that drive output sound transducers in (e.g., speakers built into the portable device 115, wired headphones 125, or even wireless headphones connected to) the portable device. More about how the portable device uses the messages to change a playback version of the movie asset is described in FIG. 6.

In one embodiment, any portable playback devices participating in playing back the movie asset may need to be synchronized with the central multimedia device 105 (and each other). For example, synchronizing video and/or audio playback between multiple playback devices requires an establishment of a clock (clock time) that is shared or known among the playback devices and the central multimedia device, so that an audio signal heard on one device matches, in a timing sense, the video being displayed on another, and so that playback on one device does not lag behind playback on another. Some approaches use a separate synchronization time-server, which sends and receives time stamps to and from each playback device. Other approaches use a master-slave arrangement such as Precision Time Protocol (PTP.) Once the portable playback devices (e.g., 115) are synchronized with the central multimedia device 105, simultaneous playback between the devices is a simple matter of replacing an identified segment during playback in the portable playback device 115, with its different version of that segment. In one embodiment, the portable playback devices are synchronized with the central multimedia device before the playback of the movie asset starts at the central multimedia device and/or the portable playback device.

Figure 2:
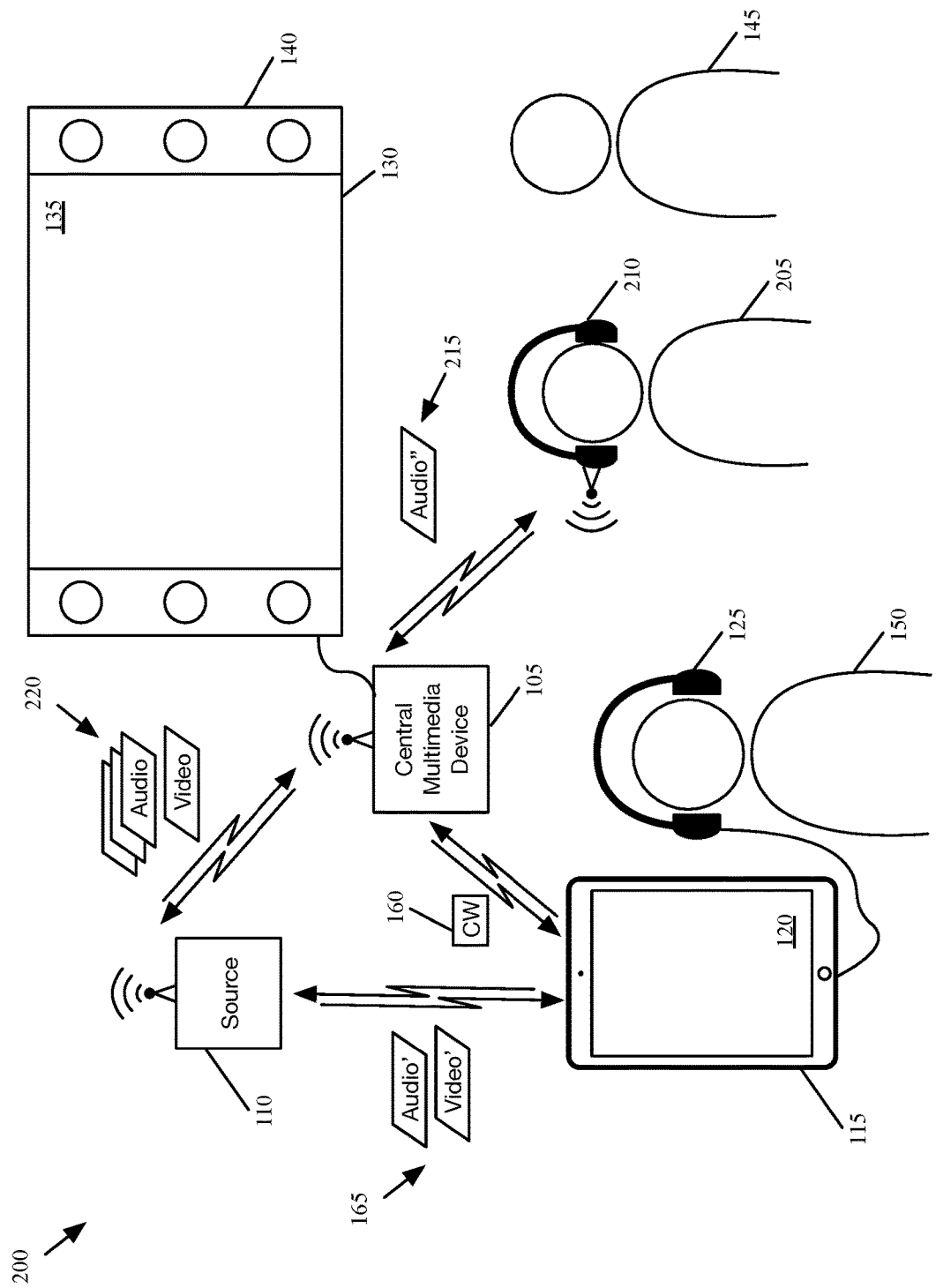
FIG. 2 depicts another example of several people with different audio-visual needs watching and/or listening to different versions of a movie asset.

Along with transmitting alert messages (e.g., 160), the central multimedia device 105 may also wirelessly transmit alternative audio of the movie asset to portable devices through the use of an "audio transmission feature", while the central multimedia device 105 is playing back the movie asset. FIG. 2 illustrates one such example. FIG. 2 depicts a room 200, similar to room 100 in FIG. 1, in that the different versions of a movie asset are being played back by central multimedia device 105 and (e.g., first) portable device 115. The central multimedia device 105 in room 200, however, is also transmitting an alternative (e.g., second or different version) audio signal 215 to wireless headphones 210 (e.g., second portable device), during playback of the movie asset. Specifically, a person 205 is watching the movie asset displayed on the display screen 135 of the television 130, while listening to different audio than that is being played by the speakers 140, through the use of headphones 210. For example, the person 145 (e.g., an adult) may be watching a movie on television 130 that has offensive language. Instead of having the person 205 (who may be a young child) cover their ears when the offensive language occurs, the person 205 wears the wireless headphones 210 that receive a different version of the audio. In one embodiment, when the built-in speakers 140 output offensive language, the headphones may output e.g., a muted audio signal or a different word or phase. When there is no offensive language, the headphones 210 may receive the same audio signal as the audio signal being played back by the built-in speakers 140 of the television 130. In one embodiment, the headphones 210 may stream the audio signal from the central multimedia device 105, while the movie asset is played back, while in another embodiment, the headphones 210 may download the entire sound track of the movie asset (containing the audio signal) from the central device 105 (or the source 110).

Listening to different (or similar) versions of audio may have several other advantages. For example, the person 205 wearing the headphones 210 may be of an appropriate age (e.g., an adult) to watch the movie asset, and therefore listen to "adult" dialog (e.g., such as dialog with offensive language), but may require audio assistance which the other person 145 watching the movie asset does not require. For instance, if the person 205 is hearing impaired, the audio signal 215 may be enhanced (e.g., by the central multimedia device 105), such that the person 205 may hear the audio more clearly through the headphones 210. Rather than (or in addition to) being hearing impaired, the person may be proficient in a different language (e.g., French) than person 145 (e.g., who is proficient in another language, such as English). Instead of forcing person 205 to watch subtitles, person 205 may listen to a French version of the audio, through the headphones 210, while person 145 watches the movie asset in English. Thus, the (e.g., first) audio signal that drives the sound output transducers of the built-in speakers 140 includes dialog in (e.g., a first language) English, while the (e.g., second) audio signal that drives the sound output transducers of the wireless headphones 210 includes dialog in (e.g., a second language) French. In one embodiment, audio may also be transmitted to portable devices that may otherwise be capable of streaming the audio, such as portable device 115. For example, portable device 115 may stream the video data from the source 110, while receiving the audio data from the central multimedia device 105. These are just a few examples of the advantages of the audio transmission feature. There may be additional advantages and scenarios in which such a feature may be used.

The audio transmission feature may be activated in a similar manner to that of the messaging feature. For instance, within a GUI (e.g., menu item) of the video playing application, a person (e.g., 145 or 205) may switch a GUI item to an "On" position to activate the audio transmission feature. Once activated, the central multimedia device 105 may initiate a network discovery protocol process in order to identify portable devices within the vicinity. More about identifying portable devices is described in FIG. 4. Once identified, the GUI may display the portable devices (e.g., 210) that are capable of receiving audio as GUI items. The person can then select a GUI item associated with a particular device and apply particular settings. For instance, the person may specify a particular language (e.g., French) of the audio that is to be transmitted to the selected device. Also, the person may define a spectral shape or a volume level of the audio signal that is to be transmitted (e.g., to aid a person that may be hearing impaired) to the selected device.

Once the central multimedia device 105 starts to play the movie asset (or immediately prior to starting) the central device may stream a different version of audio for the movie asset based on the applied settings. For instance, if the person 205 wants to watch the movie asset in French, the central multimedia device 105 may retrieve, through the source 110, a French version of the audio. The source 110 may then transmit data packets 220 containing the same digital video and audio data (as in data packets 155 of FIG. 1), but also include other versions (e.g., the French version) of the audio. The central device 105 may then process the digital video and audio data from the data packets 220 and wirelessly transmit an audio signal 215 to the wireless headphones 210 that is a different version than the rendered audio signal transmitted to the television 130 to drive the sound output transducers of its built-in speakers 140. In one embodiment, rather than streaming a different version, the central multimedia device 105 may process the digital audio data (e.g., received in data packets 155) into different audio signals. For example, rather than streaming a different version of the audio from a remote server, the central multimedia device 105 may locally process the digital audio data to produce a version of the audio signal that may be appropriate for a hearing impaired person.

Figure 3:
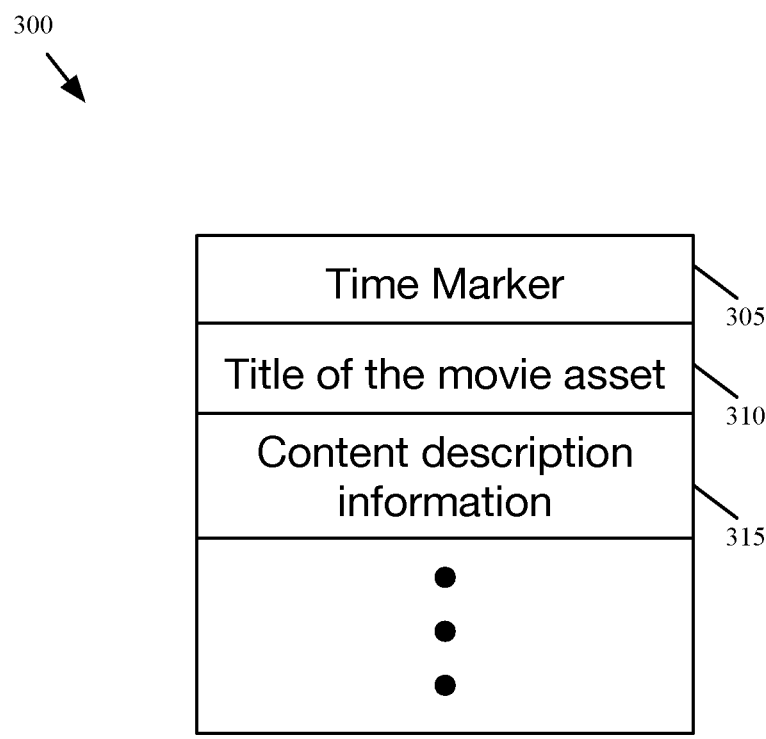
FIG. 3 shows an example of a data structure of an alert message that is wirelessly transmitted by a central multimedia device to portable electronic devices that are playing back a movie asset along with the central multimedia device.

FIG. 3 shows one example of a data structure 300 of an alert message (e.g., codeword or "CW") that is wirelessly transmitted by the central multimedia device 105. As previously described, the alert message may describe a selected segment (or an upcoming or future segment) of the movie asset (e.g., as short as a few consecutive frames, or as long as a few seconds, of the movie asset) that is going to be streamed and played back by the central multimedia device 105 on the television 130. The segments may be selected by an author or service provider of the movie asset as having certain content that may not be appropriate for all audiences. The alert messages may then be created (e.g., by the video playback application or the service provider) for each of the selected segments in order to wirelessly transmit to portable devices. The alert message may then be received and used by portable devices (e.g., 115) to playback a different version of the segment of the movie asset than being played back by the central multimedia device 105. The data structure 300 may include a time marker 305, a title of the movie asset 310, and content description information regarding the segment of the movie asset (e.g., whether the segment contains violence, offensive language, or nudity) in which the message describes. The time marker 305 is for indicating when a portable device (and the central multimedia device) should playback their respective versions of the movie asset in order for both devices to playback simultaneously. For instance, the time marker 305 may indicate that the portable device should playback a version of the segment of the movie asset (e.g., begin at 42 min and 10.04 seconds and end at 42 min and 20.2 seconds, relative to the start of the movie at 00:00:0.0; or it may include the time codes that refer to the starting frame and ending frame of the segment), in order for the portable device to playback the version of the segment simultaneously with playback of another version of the segment by the central multimedia device 105. With the internal clocks of the portable devices having been synchronized with the internal clock of the central multimedia device, the time marker is therefore correctly interpreted in each of the portable devices, ensuring that synchronized playback is maintained between all of the devices (e.g., portable and central multimedia), during and after the upcoming segment has been played. For instance, the time marker 305 may indicate the start of the segment and the duration of the segment (e.g., one second), in which the portable device is to playback the segment. In one embodiment, the time marker 305 may include a numerical indication (e.g., time code) that is used to identify the particular segment (e.g., each segment having a predefined and unique number). Once identified relative to the shared clock, the portable device may intrinsically know when to playback the segment.

The title of the movie asset 310 identifies the particular movie asset that is to be played back. Since a movie may have several versions (e.g., an extended version, a 3D version), the portable device 115 may use this information to stream a proper movie asset that is currently being played back by the central multimedia device 105 from a service provider.

The content description information 315 describes what type of video content is contained within a video signal of the segment and/or what type of audio content is contained within an audio signal of the segment. As previously described, the author or the service provider of the movie asset may define this content description information at creation of the movie asset. In one embodiment, the content description information is automatically generated by content recognition software. The types of video content that the information 315 may describe includes whether scene within the segment includes violence, graphical content (e.g., blood), and nudity. The types of audio content that the information 315 may describe includes whether the scene includes offensive language (e.g., profanity) or any type of "suggestive" language (including sexual suggestive language). In one embodiment, the content description information 315 may indicate a MPAA rating (e.g., such as G, PG, PG-13, R, and NC-17) for the particular segment. This information, as later described, may be used by the portable device to obtain and playback a different, more appropriate version, of the segment of the movie asset for the user 150 (e.g., a young child), than the segment of the movie asset currently being played back by the central multimedia device 105.

The data structure 300 may include additional information. For example, the data structure 300 may include information relating to how a receiving portable device should be rendering and playing the audio signal of the segment. The information may include a volume level in which the audio signal should be played and/or data indicating how the portable device should equalize (e.g., adjust the spectral shape) of the audio signal. In this way, each of the devices (e.g., portable and central multimedia) may playback the audio consistently, even though the portable devices may be playing back different versions of the movie asset than the central multimedia device. Furthermore, the data structure 300 may include data indicating which portable devices should be playing back particular versions of the movie asset. For instance, a user (e.g., 145), upon activation of the messaging feature within the video playback application, may specify that portable device 115 may only playback movie assets that have an MPAA rating of "PG-13".

Figure 4:
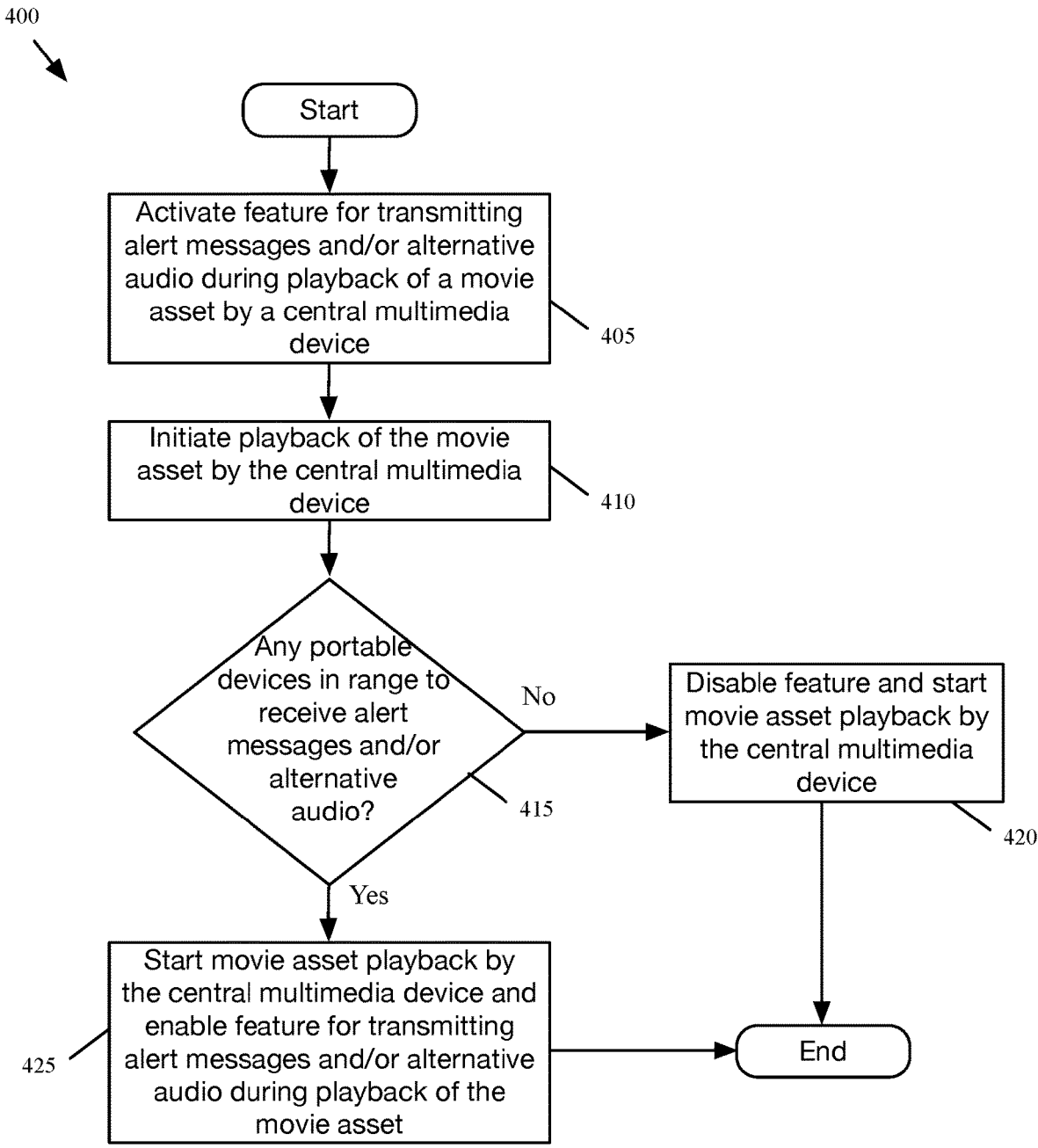
FIG. 4 is a flowchart of one embodiment of a process to wirelessly transmit alert messages and/or alternative audio during playback of a movie asset when portable electronic devices are in range to receive the alert messages and/or alternative audio.

FIG. 4 is a flowchart of one embodiment of a process 400 to wirelessly transmit alert messages and/or alternative audio signals during playback of a movie asset. The process 400 will be described by reference to FIGS. 1-2. For example, the process 400 may be performed by central multimedia device 105. It should be understood that process 400 may be performed once a user (e.g., 145) is viewing a GUI of a video playback application, which is running on the central multimedia device 105, and being displayed on a display screen (e.g., such as display screen 135 of television 130), as described in FIG. 1. In particular, the user 145 may be viewing within the GUI a menu option (e.g., "Settings") for changing different playback settings. In FIG. 4, process 400 begins by activating (at block 405) a feature for transmitting alert messages (e.g., codewords or "CWs") and/or a feature for transmitting audio during playback of a movie asset. The "messaging feature," as previously described is a feature in which the central multimedia device may periodically transmit alert messages that are received by portable devices (e.g., 115), which then use them to retrieve an appropriate segment of a movie asset and playback the appropriate segment of the movie asset simultaneously with playback of the movie asset by the central multimedia device 105. The "audio feature", as previously described, is a feature that allows the user 145 to select specific portable devices to receive either different or similar versions of an audio signal of the movie asset that is to be played back at the specific portable device during playback of the movie asset by the central multimedia device. To activate either feature, the user 145 may do so through a remote control or a software application running on a portable device (e.g., such as 115 or a smartphone). For instance, to activate, the user may simply select a switch displayed within the menu (e.g., through a tap gesture on a mirrored image of the switch that is displayed on the touch-sensitive display screen 120 of the portable device 115). Once the messaging feature is activated, the central multimedia device 105 may wait until initialization of playback to start sending messages. This may be due to the fact that at this point, the user 145 may not have yet selected a movie asset for playback. Or, if the user 145 has selected a movie asset, the central multimedia device 105 may still withhold from transmitting alert messages, as the user 145 may change which movie asset the user 145 wishes to playback.

When the user 145 selects the audio feature, the central multimedia device may perform additional operations. For instance, once selected, the central multimedia device may need to identify portable devices that are in the vicinity of the central multimedia device (e.g., within the same wireless computer network). To identify the devices, the central multimedia device may perform a network discovery protocol process over the wireless computer network that identifies each portable device by their respective addresses (e.g., IP addresses). In one embodiment, the central multimedia device may emit a signal beacon to discover any portable devices within a particular range of the central multimedia device (or within the wirelessly computer network in which the central device is a part of) and to acquire their addresses. Once the addresses are identified, the central device may initiate a communication link (e.g., via a peer-to-peer wireless network) with each portable device using the wireless network. In one embodiment, with an established communication link, the portable device may communicate with the central device by transmitting identification data (e.g., a device name) and any data describing their capabilities (e.g., whether the portable device has echo, noise cancellation). In one embodiment, the communication link may already be established, prior to performing the network discovery protocol process. In one embodiment, the central device may already have this information based on previously established communication links. The central multimedia device 105 may then display a list of GUI items within the menu that each are associated with a portable device that has an established communication link. For example, each GUI item may be a device name associated with one of the portable devices. The user 145 may then select a particular portable device (e.g., 210) that the user wants to receive a different (or similar) version of the audio signal of the movie asset. Once selected, the GUI may then display several additional user-selectable options for defining what type of audio signal is to be transmitted to the portable device. For instance, one option may dictate what version (e.g., based on MPAA ratings) of the audio signal of the movie asset the central multimedia device 105 will transmit to the selected portable device. Another option may set a particular language setting, in which case, the central multimedia device 105 may then transmit a version of the audio signal in that particular language. Another option may adjust the audio signal for the hearing impaired. The GUI may also display several options that specify audio processing operations. For example, the GUI may include an echo, noise cancellation option, a volume control, and an equalization setting for adjusting the spectral shape of the audio signal to be transmitted to the selected portable device. It should be understood that the options are only a few examples and that other audible options not currently described may be available for user selection.

The process 400 initiates (at block 410) playback of the movie asset at the central device. This initiation may be in response to receiving a request to begin playback of (e.g., a first version of) the movie asset. For instance, the user select "Play" on a remote control. Once initiated, but prior to starting playback of the movie asset, the process 400 determines (at block 415) whether there are any portable devices in range of the central device to receive the alert messages and/or alternative audio. This determination may be similar to that of block 405, when the central multimedia device 105 performed a discovery protocol process. For example, the central multimedia device 105 may emit a beacon signal to determine whether any portable devices are in the vicinity of the central multimedia device 105 and are capable of receiving either (1) messages or (2) audio or both. In one embodiment, the central multimedia device 105 may also emit synchronization messages to portable devices in range of the central multimedia device, in order for internal clocks of the portable devices to stay in sync with the internal clock of the central multimedia device, especially since such clocks may drift over the full length of a movie assets playback. If no devices are in range, the process 400 disables (at block 420) the messaging feature and/or audio transmission feature (if not already disabled) and starts playback of the movie asset by the central multimedia device 105. In one embodiment, the central multimedia device 105 may prompt the user (e.g., a pop-up displayed on the display screen 135 of the television 130), informing the user that the features have been disabled. The features may be disabled in order to save power and computational processing at the central multimedia device 105.

If, however, portable devices are in range to receive messages and/or audio from the central multimedia device 105, the process 400 starts (at block 425) playback of the movie asset by the central device and enables the messaging feature and/or the audio transmission feature during playback of the movie asset. To start playback, as described in FIGS. 1 and 2, the central multimedia device 105 may begin streaming data packets 155 containing digital video data and digital audio data of the movie asset. The central multimedia device 105 may then process the data to produce a digital video signal (e.g., a first video signal) and a digital audio signal (e.g., a first audio signal). Once the signals are produced, the central multimedia device 105 may signal the start of playback by transmitting the produced signals to the television 130, where the video signal is to be displayed on the display screen 135 of the television 130 and a rendered audio signal is to drive at least one sound output transducer of the built-in speakers 140 of the television 130. Contemporaneously with streaming the data packets 155, the central multimedia device 105 may wirelessly transmit, over the wireless network, an alert message (as described in FIG. 3), in which the central multimedia device 105 signals the portable devices (e.g., 115) to start playback of the movie asset. For instance, the portable devices may use the transmitted alert message to retrieve a first (e.g., beginning) segment of the movie asset, in order for both the central multimedia device and portable devices to begin playback (of the start of the movie asset) simultaneously. In another embodiment, the central multimedia device 105 may signal the portable devices when to start playback, using the synchronization messages. In one embodiment, the central multimedia device 105 may transmit the alert message before the data packets 155 are streamed from the source. The central multimedia device 105 may continue to repeatedly transmit the further alert messages and/or alternative audio during the entire playback of the movie asset for each selected upcoming segment of the movie asset. The portable devices may use the further alert messages (as described in FIG. 3), particularly the time markers 305, to ensure that each retrieved segment is played back simultaneously with a corresponding segment at the central multimedia device 105, thereby ensuring that all devices can playback the movie asset at the same time, throughout the entire length of the movie asset. In one embodiment, as the alert messages describe particular segments of the movie asset, and are not meant for any particular portable device, the alert messages are wirelessly transmitted into the air, without any particular destination. Portable devices that wish to playback a version of the movie asset may simply start playback of the movie asset (e.g., through a video playback application) and use alert messages received over the air to playback particular versions of the movie asset according to user settings of each portable device. In other words, by transmitting "generic" alert messages, e.g., not meant for any particular portable device, the central device 105 may limit the amount of data transmission; thereby reducing its computational workload.

Some embodiments perform variations of the process 400. For example, the specific operations of the process 400 may not be performed in the exact order shown and described. The specific operations may not be performed in one continuous series of operations, and different specific operations may be performed in different embodiments. For instance, in one embodiment, the process 400 may determine whether there are any portable devices in range (as described at block 415) before the central multimedia device 105 initiates (at block 410) playback of the movie asset.

Figure 5:
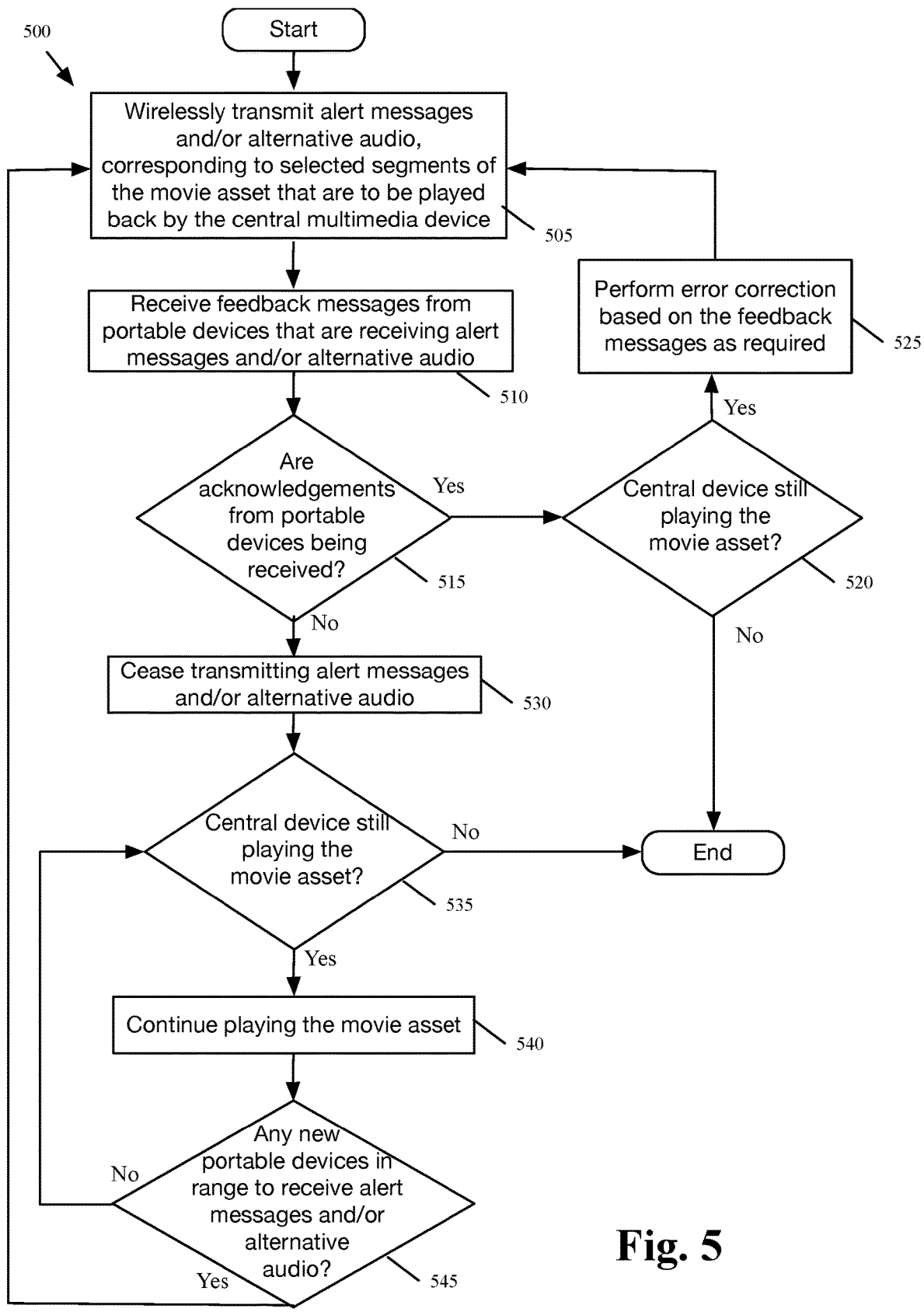
FIG. 5 is a flowchart of one embodiment of a process to perform error correction at a central multimedia device in response to receiving feedback messages from portable electronic devices that are receiving alert messages and/or alternative audio from the central multimedia device during playback of the movie asset.

During playback of the movie asset, portable devices may move about the room (e.g., 100) or out of the room entirely. In the case where the portable devices move far away from the central multimedia device 105, alert messages may not be received (e.g., dropped), which may interrupt playback at the portable devices. To solve this problem, the central multimedia device 105 may be performing constant error correction operations in order to ensure that all portable devices receiving alert messages do not experience interruptions during playback. FIG. 5 is a flowchart of one embodiment of a process 500 to perform error correction in response to receiving feedback messages from portable devices that are receiving alert messages and/or alternative audio during playback of the movie asset. This figure will be described in reference to FIGS. 1 and 2. In FIG. 5, process 500 begins by wirelessly transmitting (at block 505) alert messages and/or alternative audio corresponding to selected upcoming or future segments of the movie asset that are to be played back by the central multimedia device 105 for display on the display screen 135 of the television and for audio output by built-in speakers 140. In one embodiment, a selected segment of the movie asset may be an upcoming segment (e.g., a second segment) of the movie asset that is to be played, subsequent to playback of a current segment (e.g., a first segment) of the movie asset.

The process receives (at block 510) feedback messages from portable devices (e.g., a second playback device) receiving alert messages and/or alternative audio. This feedback messages may be in the form of data packets that are wirelessly transmitted using BLUETOOTH protocol, wireless local area network, or any other wireless communication method. In one embodiment, the reception of feedback messages may be in response to portable devices receiving the (e.g., first) alert message and/or alternative audio from the central multimedia device 105. The feedback messages may include information regarding the wireless transmission of the alert messages, such as a timestamp that indicates when the portable device initially received an alert message (e.g., a most recently received alert message). This timestamp may then be used by the central device to determine a "feedback timing" that represents the amount of time it took for the portable device to receive the most recent alert message and the amount of time it took for the feedback message to be received by the central multimedia device 105. The feedback message may also include the bit error ratio of the alert message received by the portable device. The feedback message may also include the strength of the wireless signal that the central multimedia device 105 uses to transmit the alert message and/or may also include data indicating whether the portable device has stopped playback of the movie asset. In one embodiment, the feedback messages may include an acknowledgement of receipt of the alert messages and/or alternative audio. In another embodiment, the feedback messages may contain information indicating that a communication link between the central multimedia device 105 and the portable device is down, which may require the central multimedia device to reestablish connection.

The process determines (at block 515) whether there are acknowledgements from portable devices being received by the central multimedia device 105. This determination may be made based on several factors. For example, if the central device 105 did not receive feedback messages (in response to the central multimedia device 105 transmitting an alert message), it may be determined that there are no portable devices receiving and using the alert messages. This determination may also be made based on information/data contained within the feedback messages. For example, the determination may be made when all devices responding with feedback messages have indicated that they are not using and/or receiving the alert messages/alternative audio anymore e.g., the feedback messages include a "stopped playback" indication for indicating that playback has stopped on the portable device (e.g., due to the user pressing a "stop" button or turning off the device), or the feedback messages not including an acknowledgment of receipt of the alert message and/or alternative audio. In one embodiment, the central multimedia device 105 may periodically transmit a beacon signal, requiring portable devices using alert messages and/or alternative audio to respond; if a portable device does not respond, it may be determined that this device is no longer receiving alert messages and/or alternative audio from the central multimedia device 105.

If it is determined that acknowledgements from portable devices are still being received, the process 500 determines (at block 520) whether the central multimedia device 105 is still playing the movie asset. This determination may be made based on the description of the last alert message transmitted. For instance, if the last alert message transmitted described the next selected (e.g., upcoming) segment as being the last segment of the movie asset to be played, then it may be determined that the movie asset is no longer playing. In contrast, this determination may be made based on whether the movie asset has been paused or stopped by the user (e.g., 145). If the movie asset is no longer playing, the process 500 will end. Once the process ends, the central multimedia device 105 may prompt the user, indicating that the messaging and/or audio transmission feature(s) have been disabled. This prompt may be in the form of a pop-up notification displayed on the display screen 135 of the television 130, for example. If, however, the movie asset is still playing, the process 500 performs (at block 525) error correction (e.g., network optimization operations) as required based on the data (or information) contained within the feedback messages received from the portable devices, such that wireless transmission of additional alert messages may be optimized. For example, the central device 105 may adjust its wireless signal in order to improve the quality of the wireless signal. For instance, the central multimedia device 105 may reduce the bit error ratio indicated in the feedback message by increasing the wireless signal strength. The central multimedia device may also reduce a delay in the portable devices receiving additional alert messages by improving network throughput for transmitting additional alert messages using the timestamp in the feedback messages. Improving network throughput may reduce an amount of time it takes for portable devices to receive the additional alert messages. It should be understood that the central multimedia device 105 may perform error correction as required by performing any type of network optimization operation. Once the error correction is performed, the process 500 returns to block 505 to transmit another alert message (e.g., for a next segment of the movie asset).

Returning to block 515, if it is determined that there are no portable devices receiving alert messages and/or alternative audio because the central multimedia device 105 does not receive acknowledgments, the process 500 ceases (at block 530) to transmit any additional alert messages and/or alternative audio by disabling the features that are currently enabled. In one embodiment, ceasing to transmit any additional alert messages causes playback of the movie asset on the portable devices to terminate. The central device 105 may prompt the user (e.g., through a pop on the display screen 135 of the television 130) with information, indicating that these features have been disabled. In one embodiment, the prompt may inform the user of the reason why the features were disabled (e.g., "All Devices Are Too Far Away"). In one embodiment, the features may be disabled in order to reduce computational stress on the central multimedia device 105 and to save power consumption. The process 500 determines (at block 535) whether the central multimedia device 105 is still playing the movie asset. Similar to block 520, if the central device 105 is no longer playing the movie asset, the process 500 ends. If, however, the movie asset is still playing, the process proceeds to continue (at block 540) to play the movie asset (e.g., by the central device 105). The process 500 determines (at block 545) whether any new portable devices (or portable devices that were previously receiving alert messages and/or alternative audio during playback of this movie asset) are in range to receive alert messages and/or alternative audio. For instance, referring to FIG. 1, if the battery of the portable device 115 was discharged, resulting in a power shutdown, the process (as described above) would have determined that this device was no longer receiving alert messages (e.g., 160). Once the user 150 plugs the device 115 into a power outlet, and powers up the device into the video playback application, the device 115 may then transmit video data packets to the central multimedia device 105, indicating that it is once again playing back the movie asset. If this is the case, the process 500 returns to block 505 and begins to wirelessly transmit alert messages and/or alternative audio, as needed. In one example, the central multimedia device 105 may re-enable the messaging and/or audio transmission features and prompt the user (e.g., 145) that alert messages and/or alternative audio are once again being transmitted by the central device 105. If, however, no devices are in range (or capable) to receive messages and/or audio, the process 500 returns to block 530 to determine whether the movie asset is still playing. If no devices are in range by the time the movie asset ends, then the process 500 ends as well.

Some embodiments perform variations of the process 500. For example, the specific operations of the process 500 may not be performed in the exact order shown and described. The specific operations may not be performed in one continuous series of operations, and different specific operations may be performed in different embodiments. For instance, in one embodiment, rather than the process 500 receiving feedback from the portable device, in response to the portable device receiving an alert message, the process 500 may receive feedback messages in less (or more) regular intervals. For example, feedback messages may be received in time intervals (e.g., every minute), rather than after the central multimedia device 105 transmits an alert message. This may occur in order to save computational power and resources. Also, in one embodiment, rather than the process 500 proceeding to (block 530 to) cease transmission of alert messages and/or alternative audio from block 515, the process 500 may proceed to block 520 if there are still portable devices using one of the features. For example, if all portable devices receiving alert messages stop providing feedback messages (or are all out of range), but at least one portable device continues to receive alternative audio, the process 500 may disable the messaging feature, and proceed to block 520. If a portable device comes into range to receive alert messages (as described in block 545), the process 500 may re-enable the messaging feature.

Figure 6:
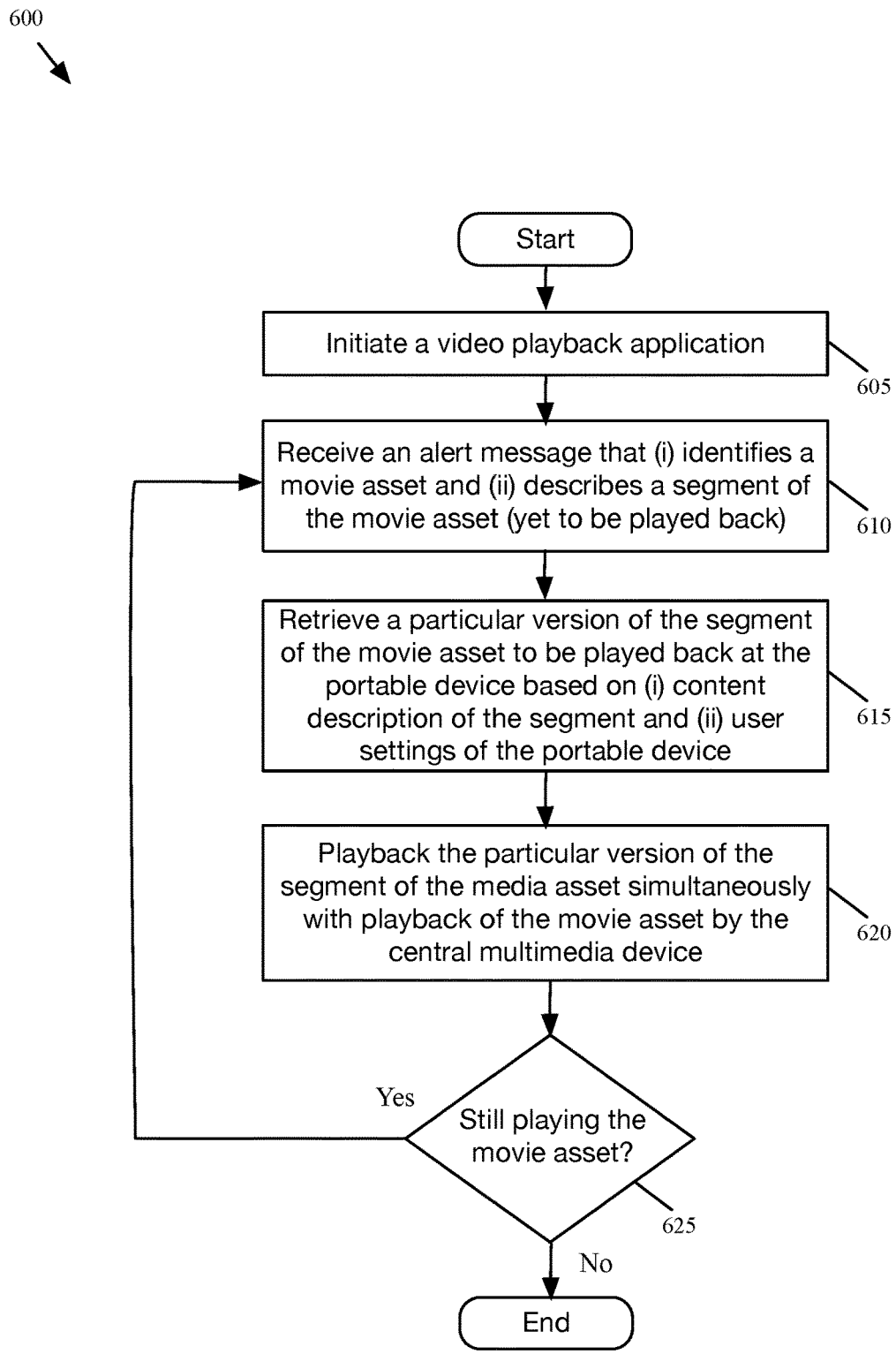
FIG. 6 is a flowchart of one embodiment of a process to retrieve and playback a particular version of a media asset by a portable electronic device.

FIG. 6 is a flowchart of one embodiment of a process 600 to retrieve and playback a particular version of a movie asset at a portable device. The process 600 may be described by reference to FIGS. 1 and 2. For example, process 600 may be performed by portable device (e.g., tablet) 115 and/or portable device (e.g., wireless headphones) 210. Hence, any portable device, regardless of whether each device performs the operations in sync with one another, may perform each specific operation described in process 600. In FIG. 6, the process 600 begins by initiating (at block 605) a video playback application. For instance, a user (e.g., 150) may turn on the portable device 115 and launch a similar video playback application that is currently running on the central device 105. Once in the application, the user 150 may navigate through the application and select a GUI item to join the central multimedia device in playing back the movie asset (e.g., a GUI item labeled "Synchronize Movie Playback with Central Multimedia Device"). Once selected, the portable device may be prompted to "Stand By" until the central multimedia device 105 starts the movie asset. The portable device 115 may establish a communication link with the central multimedia device 105 (if one has not already been established). In one embodiment, the portable device may receive a synchronization message from the central multimedia device, in order for the portable device to synchronize an internal clock of the portable device with an internal clock of the central multimedia device. Once the user 145 starts the movie asset at the central multimedia device 105, the process 600 receives (at block 610) audio and/or an alert message that (i) identifies the movie asset being played back by the central multimedia device 105 and (ii) describes the content contained within a selected (e.g., upcoming) segment of the movie asset to be played back by the central multimedia device 105. The alert message may include any of the data described in FIG. 3. For instance, the alert message may also include a time marker for synching playback at the portable device with playback by the central device 105 in order for both person 145 and 150 to watch the movie asset simultaneously on different screens (e.g., 135 and 120, respectively).

The process 600 retrieves or streams (at block 615) a particular version (e.g., a second version) of the upcoming segment of the movie asset (described by the alert message) to be played back at the portable device based on (i) the content description of the segment and (ii) user settings of the portable device. For example, the user settings (e.g., parental controls) of the portable device may indicate that the user 150 is a child (e.g., 14 years old). If the identified content description includes data that indicates that the MPAA is rated "R", then the video and audio content within the segment contains subject matter that the user 150 is not allowed to see/hear. In this case, the portable device would select a different version of the upcoming segment of the movie asset (e.g., a "PG-13" version) and retrieve it (e.g., from a service provider, through the source 110), rather than the current version ("R" version) of the movie asset to be being played back by the central multimedia device 105. In one embodiment, the portable device would transmit a request for the particular version of the upcoming segment, to a service (e.g., third party) provider, through the wireless source 110. The service provider would transmit the requested segment back, through the source 110, to the portable device. In one embodiment, instead of retrieving the segment, the portable device may retrieve the entire particular version of the movie asset from the service provider. In another embodiment, the portable device may retrieve the segment and/or entire movie asset from the central multimedia device. In another embodiment, the portable device may have already downloaded several versions of the same movie asset (e.g., both the PG-13 and R versions) and may merely retrieve the segment from its memory (e.g., local storage) or an external memory connected to the portable device 115 (through a Universal Serial Bus Connection). Also, as previously described, rather than retrieving digital audio data (e.g., second audio signal) through the source 110, in one embodiment, the portable device may receive the audio signal directly from the central multimedia device 105. In another embodiment, the portable device may retrieve additional information. For instance, the user settings of the portable device may indicate that the user 150 wants captions or subtitles displayed on display screen 120 of the portable device 115, during playback of the movie asset. In that case, the portable device 115 may use the identification and the time marker relating to the movie asset to retrieve the captions or subtitles of the audio signal from the upcoming segment of the movie asset based on the received alert message and according to user settings of the device. For example, similar to the retrieval of the segment of the movie asset, the portable device 115 may retrieve the captions or subtitles from a third party provider through the source 110; or may retrieve the captions or subtitles from a storage of the portable device 115, if they had already been downloaded. During playback of the segment of the movie asset, the retrieved captions (or subtitles) may be superimposed on the display screen 120 of the portable device 115.

Having retrieved (e.g., data packets 165 with) the appropriate upcoming segment of the movie asset for playback, the portable device 115 may process the digital video and audio data within the data packets in a similar manner as previously described in FIGS. 1 and 2. The processed data may produce a digital (e.g., second) video signal for display on the display screen 120 of the portable device 115 and a digital (e.g., second) audio signal for rendering to drive at least one sound output transducer (such as those found in the wired headphones 125 that are attached to the portable device 115).

In one embodiment, if the portable device is unable to find an appropriate version of the upcoming segment of the movie asset (e.g., there is only one version of the movie asset, which is inappropriate for user 150), playback may be adjusted in order to ensure that the user 150 does not view the content. For example, the portable device 115 may pause playback until the next alert message is received. If the segment is small enough (e.g., one second) and the content description indicates that inappropriate language is contained within the segment that the user 150 should not experience, the audio playback at the portable device 115 (e.g., particularly at the headphones 125) may be muted.

With the appropriate (e.g., second or different) version of the segment of the movie asset, the process 600 plays back (at block 620) the segment simultaneously with playback of a similar or different version of the segment by the central multimedia device 105. The portable device ensures that playback is simultaneous, using the time marker contained within the alert message, as previously described in FIG. 3. For example, with an internal clock of the portable device in sync with an internal clock of the central multimedia device, the time marker may be a certain amount of time in which both devices will playback their associated segments. For instance, the portable device may playback the second or different version of the segment at a time indicated by the time marker, according to the clock of the portable device. This ensures that all devices (central and portable) playback the same segment of the movie asset at the same time so that the users may watch the movie asset simultaneously. For instance, simultaneous playback ensures that video frames and audio signals of the upcoming segments being played back by the central multimedia device 105 and the portable device 115 are in sync as they are being displayed (e.g., on display screens 135 and 120), and rendered to drive sound output transducers (e.g., in built-in speakers 140 and headphones 125), respectively.

The process 600 determines (at block 625) whether the movie asset is still playing. If it is, the process 600 returns to block 600 to await reception of another message. If, however, the movie asset has ended, then the process 600 ends. In one embodiment, the user 150 may pause the process 600 at any time (e.g., in order to go use the restroom). Once paused, the portable device may still receive messages, but rather than retrieving a corresponding segment of the movie asset that the message describes, the portable device would stay in a holding pattern. Once the user 150 returns, the user may request the portable device to resume playback (e.g., by pressing a "Play" button), in which case the process would retrieve the segment for the most currently received message based on the most recently received alert message. Once retrieved, the portable device would use the time marker 305 from the alert message 300 to playback the retrieved segment simultaneously with the central multimedia device. In one embodiment, if the current playback position is in the middle of a current segment, the portable device may skip playback of the remaining portion (or frames) of the current segment and start playback at the next (or upcoming) segment, according to the time marker 305. In one embodiment, the user 150 may playback the version on the portable device 115 out of sync with the central multimedia device 105. To do this, the portable device may store alert messages that are received while the portable device 115 is paused, and once playback resumes, the portable device may use the alert messages in sequential order to retrieve appropriate segments for playback. For example, when the user 150 returns from the bathroom and hits the "Play" button, playback of the movie asset may continue where the user 150 left off, in order for the user to watch the full length of the film. If the user 150 wishes to catch up to the user 145, in one embodiment, the GUI of the portable device may include a GUI item for syncing playback (e.g., "Sync"). In another embodiment, the user 150 may fast forward or rewind playback, as well. In one embodiment, the user 150 may pause playback on some or all devices (e.g., including the central multimedia device 105) currently playing back the movie asset.

In one embodiment, the portable device 115 may play the (e.g., original) version of the movie asset being played back by the central multimedia device 105, when there is no inappropriate conduct. In other words, the portable device may switch between the version of the movie asset (e.g., having a first video signal and a first audio signal) being played back by the central multimedia device 105 and a different version of the movie asset (e.g., being different from the original version by having either a (e.g., second) video signal different from the first video signal and an audio signal that is the same as the first audio signal, a video signal that is the same as the first video signal and an (e.g., second) audio signal that is different from the first audio signal, or both, the video and audio signals that are different from the first video and audio signals) when inappropriate content is about to be presented. For example, the portable device 115 may start playback of a same version of a movie asset as the central multimedia device 105, even though the movie asset (in general) may contain inappropriate content at certain times within the movie asset. Once a message is received that indicates that an upcoming segment includes inappropriate content (e.g., offensive language), the portable device 115 may then retrieve a different, more appropriate version (e.g., muted offensive language), and adjust playback of the movie asset by substituting playback of the movie asset with the different version of the movie asset. For instance, the portable device may buffer (in memory) both versions of upcoming segments and then when playback is required; the portable device may substitute (e.g., switch) the version of the movie asset currently being played back with the appropriate version of the segment that is buffered. In one embodiment, in substituting playback of the movie asset with the different version, the portable device 115 may perform similar operations as described in block 620 in FIG. 6 (e.g., playing back the different version simultaneously with the version being played back by the central multimedia device 105). Once the portable device 115 receives an alert message that does not describe an upcoming segment as including the inappropriate content (because the next scene in the upcoming segment does not include offensive language), the portable device 115 may resume playing the same movie asset as the central multimedia device 105.

Some embodiments perform variations of the process 600. For example, the specific operations of the process 600 may not be performed in the exact order shown and described. The specific operations may not be performed in one continuous series of operations, and different specific operations may be performed in different embodiments. For example, as described in FIG. 5, the portable device (e.g., 115) may transmit feedback messages to the central multimedia device 105. In one embodiment, the portable device may transmit feedback messages after reception of the alert message from the central multimedia device, at block 610. In another embodiment, the feedback messages may be transmitted periodically (e.g., every minute) and at any point during the operations described in FIG. 6. In addition, rather than the portable device initiating the video playback application at block 605, prior to the central multimedia device starting playback of the movie asset, in one embodiment, the portable device may initiate the video playback application, while the central multimedia device is playing the movie asset. With the application open, the user of the portable device may select a "Play" button in the application, in which case the application may present the user with a selectable option to join synchronized playback with the central multimedia device. In one embodiment, if the portable device 115 does not receive an alert message for an upcoming segment to be played back by the portable device, at block 610, the portable device may pause playback at the end (or current playback position) of the current segment, as this may be an indication that the central multimedia device 105 has paused playback and/or malfunctioned in some way.

As previously explained, an embodiment of the invention may be a non-transitory machine-readable medium (such as microelectronic memory) having stored thereon instructions, which program one or more data processing components (generically referred to here as a "processor") to perform the digital audio processing operations previously retrieving (e.g., streaming video and audio content), playing back video and audio content. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method performed by a central multimedia device for playback of an audio/video (A/v) asset in several playback devices, the method comprising:
receiving a request to play an A/V asset;
synchronizing i) a first internal clock that is used for playback through a playback device with ii) a second internal clock of an electronic device;
signaling a start of playback of the A/V asset through the playback device;
signaling a start of playback of the A/V asset through the electronic device, wherein the playback device and the electronic device are in sync as they playback the A/V asset;
transmitting an alert message to the electronic device, wherein the alert message identifies the playback of the A/V asset through the playback device or the electronic device and includes a description of an upcoming or future segment of the A/V asset, wherein a first version of the upcoming or future segment is to be played back through the playback device, and wherein in response to receiving the alert message the electronic device becomes configured to select a second version of the upcoming or future segment of the A/V asset in accordance with i) user settings of the electronic device and the description of the upcoming or future segment;
receiving a feedback message from the electronic device; and
in response to receiving the feedback message, ceasing to transmit additional alert messages to the electronic device, causing the electronic device to pause playback of the A/V asset once the electronic device has played the second version of the upcoming or future segment of the A/V asset.

2. The method of claim 1, wherein the feedback message includes information indicating that the electronic device is not going to use the additional alert messages to select upcoming or future segments of the A/V asset.

3. The method of claim 1, wherein the alert message further includes a time marker at which the first version of the upcoming or future segment of the A/V asset is to be played back through the playback device, wherein the electronic device synchronizes playback of the second version of the upcoming or future segment of the A/V asset with playback of the first version of the upcoming or future segment of the A/V asset by playing back the second version of the upcoming or future segment at a time indicated by the time marker from the alert message, according to the second internal clock of the electronic device.

4. The method of claim 1,
wherein the first version of the upcoming or future segment comprises a first audio signal and the second version of the upcoming or future segment comprises a second audio signal that is different than the first audio signal.
wherein the electronic device is configured to playback the second audio signal by streaming the second audio signal to a wireless headset such that playback of the second audio signal by the wireless headset is in sync with playback of the first version of the upcoming or future segment through the playback device.

5. The method of claim 1, wherein the electronic device is a first electronic device, wherein the first version of the upcoming or future segment comprises an audio signal, wherein the method further comprises transmitting a different version of the audio signal to a second electronic device, in response to which the second electronic device becomes configured to synchronize playback of the different version of the audio signal with playback of the first version of the upcoming or future segment of the A/V asset through the playback device.

6. The method of claim 1, wherein in response to receiving the alert message the electronic device becomes further configured to substitute playback of the first version of the upcoming or future segment with playback of the selected second version of the upcoming or future segment of the A/V asset.

7. The method of claim 1 further comprising enabling a messaging feature to wirelessly broadcast alert messages to any electronic device within a particular range of the central multimedia device to use for playback of the A/V asset.

8. The method of claim 7, wherein ceasing to transmit additional alert messages comprises disabling the messaging feature, while continuing to playback the A/V asset through the playback device.

9. The method of claim 8, wherein the electronic device is a first electronic device, wherein the method further comprises:
determining that a second electronic device is within the particular range of the central multimedia device; and
in response to determining that the second electronic device is within the particular range, reenabling the messaging feature to wirelessly broadcast alert messages such that the second electronic device receives alert messages for playback of the A/V asset.

10. The method of claim 9, wherein the feedback message is a first feedback message, wherein the method further comprises:
receiving a second feedback message that includes at least one of a timestamp that indicates when a particular alert message was received by the second electronic device and a quality of a wireless signal over which the particular alert message is wirelessly broadcasted to the second electronic device; and
improving at least one of (1) network throughput for broadcasting additional alert messages using the timestamp and (2) signal quality by reducing a bit error ratio during the broadcast of the additional alert messages.

11. A central multimedia device comprising:
a processor; and
memory having stored therein instructions that when executed by the processor
receive a request to play an audio/video (A/V) asset;
synchronize i) a first internal clock of the central multimedia device that is used for playback through a playback device with a second internal clock of an electronic device;
signal a start of playback of the A/V asset through the playback device;
signal a start of playback of the A/V asset through the electronic device, wherein the playback device and the electronic device are in sync as they playback the A/V asset;
wirelessly transmit an alert message to the electronic device, wherein the alert message identifies the playback of the A/V asset through the playback device or the electronic device and includes a description of an upcoming or future segment of the A/V asset, wherein a first version of the upcoming or future segment is to be played back through the playback device, and wherein in response to receiving the alert message the electronic device becomes configured to select a second version of the upcoming or future segment of the A/V asset in accordance with i) user settings of the electronic device and the description of the upcoming or future segment;
receive a feedback message from the electronic device; and
in response to receiving the feedback message, cease to transmit additional alert messages to the electronic device, causing the electronic device to pause playback of the A/V asset once the electronic device has played the second version of the upcoming or future segment of the A/V asset.

12. The central multimedia device of claim 11, wherein the electronic device is a first electronic device, wherein the first version of the upcoming or future segment comprises an audio signal, wherein the memory stores further instructions that when executed by the processor transmits a different version of the audio signal to a second electronic device, in response to which the second electronic device becomes configured to synchronize playback of the different version of the audio signal with playback of the first version of the upcoming or future segment of the A/V asset through the playback device.

13. The central multimedia device of claim 11, wherein the alert message further includes a time marker at which the upcoming or future segment of the first version of the A/V asset is to be played back through the playback device, wherein the electronic device synchronizes playback of the second version of the upcoming or future segment of the A/V asset with playback of the first version of the upcoming or future segment of the A/V asset by playing back the second version of the upcoming or future segment at a time indicated by the time marker from the alert message, according to the second internal clock of the electronic device.

14. The central multimedia device of claim 11, wherein the first version of the upcoming or future segment comprises a first audio signal and the second version of the upcoming or future segment comprises a second audio signal that is different than the first audio signal.

15. The central multimedia device of claim 14, wherein the electronic device is configured to playback the second audio signal by streaming the second audio signal to a wireless headset such that playback of the second audio signal by the wireless headset is in sync with playback of the first version of the upcoming or future segment through the playback device.

16. The central multimedia device of claim 11, wherein the electronic device comprises one of a smart phone, a tablet computer, and a laptop.

17. The central multimedia device of claim 11, wherein the first version of the upcoming or future segment of the A/V asset has a first audio signal and a video signal and the second version of the upcoming or future segment of the A/V asset has a second audio signal and a second video signal, wherein at least one of the second audio signal and the second video signal is different from the first audio signal and the first video signal, respectively.

18. An electronic device comprising:
a processor; and
memory having stored therein instructions that when executed by the processor causes the electronic device to
initiate synchronized playback of an audio/video (A/V) asset with playback of the A/V asset by a playback device that is configured to obtain the A/V asset from a central multimedia device;
in response to obtaining, over a computer network and from the central multimedia device, an alert message describing an upcoming segment of the A/V asset to be played by the playback device,
select and retrieve a different version of the upcoming segment of the A/V asset based on the alert message, and
substitute playback of the upcoming segment of the A/V asset with the different version of the upcoming segment of the A/V asset; and
in response to not obtaining, over the computer network and from the central multimedia device, additional alert messages, pause playback of the A/V asset once the electronic device has played the different version of the upcoming segment of the A/V asset.

19. The electronic device of claim 18, wherein the A/V asset comprises an audio signal and a video signal, wherein initiating synchronized playback comprises streaming the audio signal to a wireless headset such that playback of the audio signal by the playback device is in sync with playback of the wireless headset.

20. The electronic device of claim 18,
wherein the upcoming segment of the A/V asset comprises a first audio signal and a first video signal and the different version of the upcoming segment of the A/V asset comprises a second audio signal and a second video signal,
wherein at least one of the second audio signal and the second video signal is different than the first audio signal and the first video signal, respectively.

21. The electronic device of claim 18, wherein different version of the upcoming segment of the A/V asset is retrieved from (i) the central multimedia device, (ii) a server over the Internet, or (iii) a local storage of the electronic device.

22. The electronic device of claim 18, wherein the instructions to initiate synchronized playback comprises instructions to
establish a wireless communication link with the central multimedia device; and synchronize an internal clock of the electronic device with an internal clock of the central multimedia device.

* * * * *